United States Patent
Lalam et al.

(10) Patent No.: US 9,622,193 B2
(45) Date of Patent: Apr. 11, 2017

(54) METHOD AND SYSTEM FOR REDUCING CO-CHANNEL INTERFERENCE DUE TO THE DEPLOYMENT OF FEMTOCELLS IN A MACRO-CELLULAR NETWORK

(75) Inventors: Massinissa Lalam, Rueil-Malmaison (FR); Thierry Lestable, Rueil-Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 76 days.

(21) Appl. No.: 14/117,413

(22) PCT Filed: Apr. 13, 2012

(86) PCT No.: PCT/EP2012/056755
§ 371 (c)(1),
(2), (4) Date: Nov. 13, 2013

(87) PCT Pub. No.: WO2012/156158
PCT Pub. Date: Nov. 22, 2012

(65) Prior Publication Data
US 2014/0335849 A1 Nov. 13, 2014

(30) Foreign Application Priority Data
May 18, 2011 (FR) ..................................... 11 54322

(51) Int. Cl.
*H04W 52/24* (2009.01)
*H04W 52/30* (2009.01)
(Continued)

(52) U.S. Cl.
CPC ......... *H04W 52/244* (2013.01); *H04W 24/02* (2013.01); *H04W 52/18* (2013.01);
(Continued)

(58) Field of Classification Search
CPC . H04W 16/14; H04W 72/0453; H04W 24/02; H04W 24/08; H04W 84/045; H04W 24/10; H04W 72/082; H04W 16/32; H04W 36/0083; H04W 52/243; H04W 28/16; H04W 52/0206; H04W 72/0406; H04W 52/24; H04W 52/244; H04W 52/30; H04W 52/265; H04L 5/0073
USPC .... 455/422.1, 434, 444, 448, 449, 454, 500, 455/501
See application file for complete search history.

(56) References Cited

U.S. PATENT DOCUMENTS

2009/0042593 A1 2/2009 Yavuz et al.
2009/0316585 A1 12/2009 Srinivasan et al.
(Continued)

FOREIGN PATENT DOCUMENTS

EP 2 152 041 2/2010

OTHER PUBLICATIONS

Arulselvan et al., "Distributed power control mechanisms for HSDPA femtocells", *2009 IEEE Conf.*, Apr. 2009, 6 pages.
(Continued)

*Primary Examiner* — Magdi Elhag
(74) *Attorney, Agent, or Firm* — Nixon & Vanderhye, P.C.

(57) ABSTRACT

The present invention concerns a method and system for reducing co-channel interference due to the deployment of N femtocells in a macrocellular network. Said method comprises a step (1) of taking power measurements on signals sent over this network, a step (3) of optimizing the transmission powers of the femtocells according to these measurements, and a step (4) of allocating to each femtocell its transmission power. Said method is characterized in that:
during step (1) of taking measurements, the power measurements are only made by the N femtocells and these measurements are ordered temporally by a central facility UC in the system,
during the optimization step (3), the transmission powers of the femtocells are maximized under the constraint of maintaining a minimum quality of service of terminals that would be attached to the base stations in the macrocellular network.

16 Claims, 6 Drawing Sheets

(51) Int. Cl.
*H04W 52/18* (2009.01)
*H04W 24/02* (2009.01)
*H04W 52/26* (2009.01)

(52) U.S. Cl.
CPC ......... *H04W 52/24* (2013.01); *H04W 52/243* (2013.01); *H04W 52/265* (2013.01); *H04W 52/30* (2013.01)

(56) References Cited

U.S. PATENT DOCUMENTS

| | | | |
|---|---|---|---|
| 2011/0275361 A1* | 11/2011 | Yavuz | H04W 52/143 455/422.1 |
| 2011/0312319 A1* | 12/2011 | Lindoff | H04W 72/042 455/423 |
| 2012/0113844 A1* | 5/2012 | Krishnamurthy | H04L 1/0026 370/252 |
| 2012/0238279 A1* | 9/2012 | Yu | H04W 52/244 455/449 |

OTHER PUBLICATIONS

International Search Report for PCT/EP2012/056755, mailed Jan. 3, 2013.
Written Opinion for PCT/EP2012/056755, mailed Jan. 3, 2013.
English-language translation of the Written Opinion in International Application No. PCT/EP2012/056755 filed Apr. 13, 2012.

\* cited by examiner

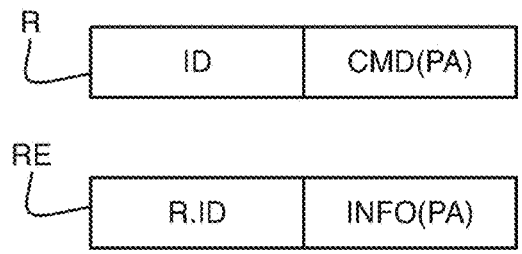
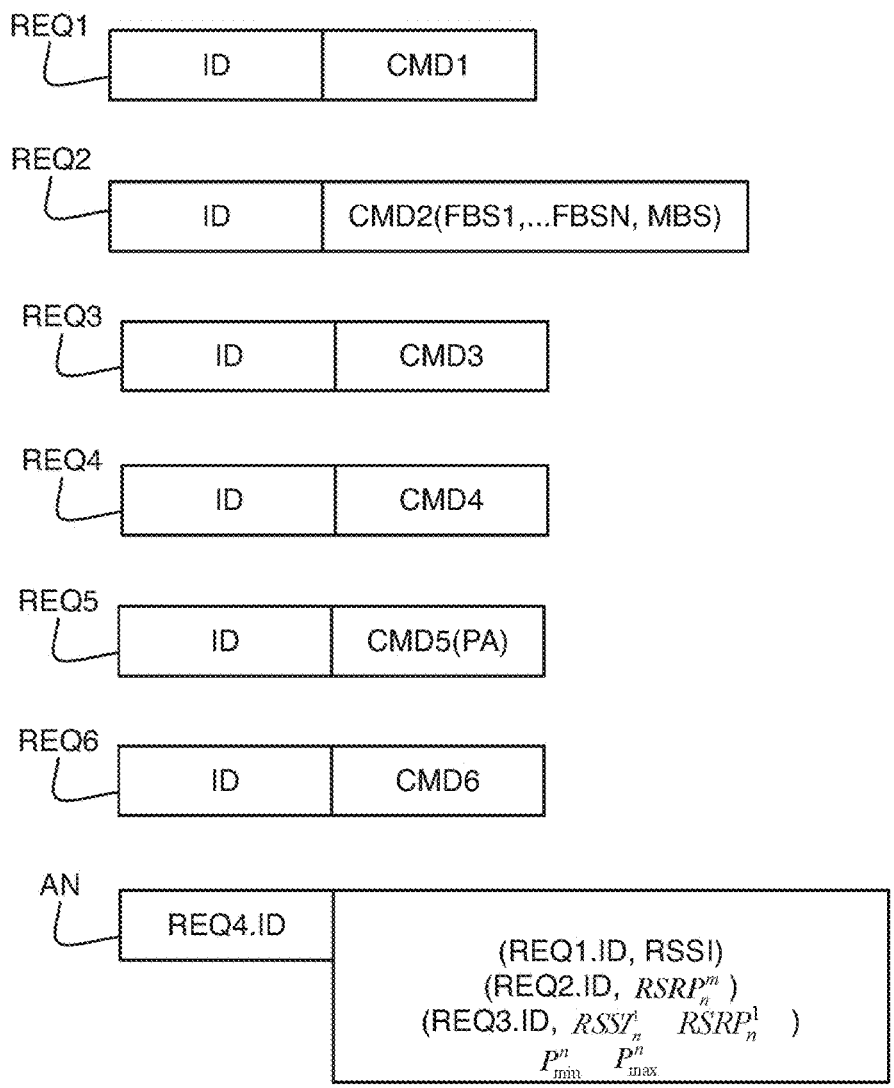
Fig. 5a
Fig. 5b

METHOD AND SYSTEM FOR REDUCING CO-CHANNEL INTERFERENCE DUE TO THE DEPLOYMENT OF FEMTOCELLS IN A MACRO-CELLULAR NETWORK

This application is the U.S. national phase of International Application No. PCT/EP2012/056755 filed 13 Apr. 2012 which designated the U.S. and claims priority to FR Patent Application No. 11/54322 filed 18 May 2011, the entire contents of each of which are hereby incorporated by reference.

The present invention concerns a method and system for reducing co-channel interference due to the deployment of femtocells in a macrocellular network.

Deploying base stations for establishing a mobile telephony service over a given territory is known. The network thus formed is hereinafter referred to as a macrocellular network.

The need to achieve a higher transmission rate by the user of this mobile telephony service, to increase the global capacity in terms of number of users connected simultaneously to a base station and to improve the coverage of this macrocellular network (in particular at the boundary of cells) without having to deploy new base stations has led to the appearance of novel technology known by the term femtocells.

A femtocell is a base station of reduced range compared with that of a base station in a macrocellular network the range of which extends over several hundred meters or even kilometers.

A femtocell is generally (but not exclusively) deployed at the home of a user and provides access to the mobile telephony network without this user having to change mobile terminal. In practice, a femtocell is connected to or integrated with the domestic gateway of a subscriber to the Internet (cable, ADSL, etc.). It uses the Internet access of this subscriber to connect to the cellular telephony network via a secure connection. It thus at less cost improves the coverage of the macrocellular network inside the dwelling.

The femtocells are deployed within a macrocellular network generally in accordance with a restricted access policy. To this end, a femtocell has a list of mobile terminals (Closed Subscriber Group—CSG) that are authorised to connect to the mobile telephony network via this femtocell. If the mobile terminal enabled is very close to the femtocell, this mobile terminal attaches to this femtocell and accesses the mobile telephony network via the Internet.

The case may also occur where all the femtocells (or at least two of them) share a common CSG list. In other words, it is not possible for a terminal in the macrocellular network to connect to one of the femtocells if it does not form part of this list, and any terminal authorised by this CSG list may connect to any of these femtocells.

However, deployment of femtocells in restricted access mode may have a very negative impact on the quality of service offered to the users who use a mobile terminal that is not authorised to access these femtocells. This is because, when such a mobile terminal is close to one of these femtocells and this femtocell operates on the same channel as that of the base station of the macrocellular network to which this mobile terminal is attached, the quality of service offered by the macrocellular network is greatly degraded because of the co-channel interference between the base station and this femtocell.

FIG. 1 shows schematically the deployment of femtocells in a macrocellular network in order to illustrate the problem of co-channel interference between this network and these femtocells.

According to this example, a set of N femtocells FBSn deployed in the same geographical area (and therefore interfering with one another) under the coverage of a macrocellular network is considered. Each femtocell FBSn uses the same channel as the macrocellular network, that is to say the same carrier frequency f (co-channel deployment). Each femtocell FBSn can fix its transmission power $P_t^n$, which may vary in a power range extending from $P_{min}^n$ to $P_{max}^n$.

A mobile terminal in the macrocellular network is hereinafter denoted MUE (Macrocell User Equipment). This terminal MUE can connect only to the macrocellular network, that is to say it does not form part of any of the CSG lists of the N femtocells. This terminal can therefore attach only to the base station MBS.

A mobile terminal authorised to attach to a femtocell FBSn is hereinafter denoted terminal FUEn (Femtocell User Equipment). This terminal can attach either to the femtocell FBSn or to the base station MBS.

In practice, M terminals MUE also interfere with one another and with the N femtocells. They will be denoted hereinafter terminals MUEm.

The quality of service perceived by the terminal is normally quantified by the Signal to Interference-plus-Noise Ratio (SINR). The SINR corresponds to the ratio of the power received by the base station MBS to the sum of all the other powers received by the interfering base stations and the thermal noise.

Thus the SINR perceived by the terminal MUEm, denoted $\gamma_{MUE_m}$, is given by:

$$\gamma_{MUE_m} = \frac{P_r^{MUE_m,macro}}{\sum_{n=1}^{N} P_r^n + \sigma_{MUE_m}^2} \quad (1)$$

where $P_r^{MUE_m,macro}$ is the power received by the terminal MUEm which is transmitted by the base station in the macrocellular network to which this terminal is attached, $P_r^n$ is the power received by the terminal MUEm which is transmitted by the femtocell FBSn, and $\sigma_{MUE_m}^2$ is the sum of the power of the surrounding thermal noise and the power received by the terminal MUEm coming from the other base stations in the macrocellular network (seen as white noise).

The power coming from the femtocell FBSn and received by the terminal MUEm can be put in the form $P_r^n = a_{m,n} P_t^n$, which is expressed by the product of the power $P_t^n$ transmitted by the femtocell FBSn and the coefficient of attenuation due to the channel separating the femtocell FBSn from the terminal MUEm To ensure a minimum service quality perceived by the terminal MUEm, the SINR $\gamma_{MUE_m}$ must be greater than or equal to a threshold value $\gamma_{MUE}^{target}$.

In a similar manner, the SINR perceived by the terminal FUEn that would be served by the femtocell FBSn, denoted $\gamma_{FUE_n}$, is given by:

$$\gamma_{FUE_n} = \frac{P_r^n}{\sum_{q \neq n} P_r^q + P_r^{FUE_n,macro} + \sigma_{FUE_n}^2} \quad (2)$$

where $P_r^n$ is the power received by the terminal FUEn that is transmitted by the femtocell FBSn, $P_r^q$ is the power received by the terminal FUEn that is transmitted by the femtocell. FBSq different from FBSn ($\forall 1 \leq q \leq N$, $q \neq n$), $P^{FUEn,macro}$ is the power received by the terminal FUEn that is transmitted by the base station in the macrocellular network that is dominant for this terminal (that is to say to which this terminal would attach if it used the macrocellular network), and $\sigma_{FUE_n}^2$ is the sum of the power of the surrounding thermal noise and the power received by the terminal FUEn coming from the other base stations in the macrocellular network (seen as white noise).

The power coming from a femtocell FBSq ($\forall 1 \leq q \leq N$, includes the serving femtocell) and received by the terminal FUEn may be put in the form $P_r^q = b_{n,q} P_t^q$, which is expressed by the product of the power $P_t^q$ transmitted by the femtocell FBSq and the coefficient of attenuation $b_{n,q}$ due to the channel separating the terminal FUEn from the femtocell FBSq.

Reducing the co-channel interference between femtocells and base stations in a macrocellular network by a minimisation of the transmission powers of these femtocells is known ("*Downlink Power Control in Co-Channel Macrocell Femtocell Overlay*", X Li et al., *IEEE 43rd Annual Conference on Information Sciences and Systems (CISS'09)*, pp. 383-388, June 2009).

Such a method consists of minimising the sum of the transmission powers $\{P_t^n\}_{1 \leq n \leq N}$ of the N femtocells under constraint of maintaining a minimum quality of service both for a terminal MUE and a terminal FUEn.

In mathematical terms, this problem of minimisation under constraint is expressed by:

$$\min_{P_t^n} \sum_{n=1}^{N} P_t^n \quad (3)$$

under the constraint of equation (4), which relates to all the transmission powers of the N femtocells FBSn in order to ensure the quality of service of the terminal MUEm:

$$\forall m \in \{1, M\}, \sum_{n=1}^{N} a_{m,n} P_t^n \leq \frac{P_r^{MUE_m,macro}}{\gamma_{MUE}^{target}} - \sigma_{MUE_m}^2 \quad (4)$$

and under the constraint of equation (5), which relates to all the transmission powers of the N femtocells FBSn in order to ensure the quality of service of the terminal FUEn:

$$\forall m \in \{1, M\}, b_{n,n} P_t^n \leq \gamma_{MUE}^{target} \left( \sum_{q \neq n} b_{n,q} P_t^q + P_r^{FUEn,macro} + \sigma_{FUE_n}^2 \right) \quad (5)$$

Equation (3) is solved in practice either by a so-called centralised approach, that is to say by a central facility, or by a so-called distributed approach, that is to say each femtocell optimises its transmission power according to the power measurements that it obtains locally.

The optimisation of the transmission powers according to equation (3) using the method described in the article by Li et al. ("*Downlink Power Control in Co-Channel Macrocell Femtocell Overlay*", X Li et al., *IEEE 43rd Annual Conference on Information Sciences and Systems (CISS'09)*, pp. 383-388, June 2009) poses problems in practice.

This is because it is necessary to know precisely the distances between the femtocells and the macrocellular terminals MUEm in order to be able to estimate the coefficients of attenuation $a_{m,n}$ due to the channels separating the femtocells FBSn from the terminal MUEm as well as the distances between each terminal FUEn and each femtocell FBSq in order to be able to estimate the coefficients of attenuation $b_{n,q}$ due to the channels separating the terminals FUEn from the femtocells FBSq. This constraint is extremely strong and difficult to obtain in practice.

In order to obtain these distances precisely, a signal of the GPS (Global Positioning System) type can be used. However, this usage is not suitable when femtocells are deployed inside a building (the most common location), an environment that is not very propitious to GPS signals.

Moreover, this optimisation of the transmission powers requires power measurements to be carried out, in particular by the terminals MUEm. This therefore requires the presence of at least one terminal MUE in the macrocellular network in order to optimise these transmission powers so as to evaluate the constraints of equation (4).

The problem solved by the present invention is to remedy the aforementioned drawbacks.

To this end, the present invention concerns a method for reducing the co-channel interference due to the deployment of N femtocells in a macrocellular network, said method comprising a step of taking power measurements of signals transmitted on this network, a step of optimising the transmission powers of the femtocells according to these measurements, and a step of allocating to each femtocell its transmission power. The method is characterised in that, during the step of taking measurements, the power measurements are only taken by the N femtocells and these measurements are ordered temporally by a central facility of the system, and during the optimisation step the transmission powers of femtocells are maximised under the constraint of maintaining a minimum quality of service of terminals that would be attached to the base stations in the macrocellular network.

According to one embodiment, during the optimisation step, the following cost function is maximised:

$$\max_{P_t^n} c = \sum_{n=1}^{N} P_t^n$$

under the constraint:

$$\forall n \in \{1, N\}, P_t^n + \sum_{m \neq n} \frac{\alpha_{n,m}}{\rho^2} P_t^m \leq \frac{P_r^{n,macro}}{\rho^2 \gamma_{MUE}^{target}} - \sigma_n^2 \leq \frac{P_r^{n,macro}}{\rho^2 \gamma_{MUE}^{target}}$$

where $P_t^n$ is the transmission power of a femtocell, referred to as FBSn. $P_t^m$ is the transmission power of a femtocell referred to as FBSm, $\alpha_{n,m}$ is the coefficient of attenuation due to the channel separating the femtocell FBSm from the femtocell FBSn, $P_r^{n,macro}$ is the power received by the femtocell FBSn from a signal that was sent by the base station in the macrocellular network considered to be dominant by the femtocell FBSn, $\sigma_n^2$ an is the power of the surrounding thermal noise perceived by the femtocell FBSn, $\rho$ a coefficient that represents the coverage of the femtocell FBSn beyond which a terminal that would be attached to a base station in the macrocellular network would see a signal to interference-plus-noise ratio greater than a threshold value $\gamma_{MUE}^{target}$.

According to a variant, the estimated transmission powers of the femtocells are weighted when they are optimised.

According to a first embodiment, during this allocation step, the transmission power of a femtocell estimated during the optimisation step is limited to the extreme values of a range of power values of this femtocell.

According to a second embodiment, during this allocation step, a zero transmission power is allocated to a femtocell if its transmission power estimated during the optimisation step is zero.

According to a third embodiment, during this allocation step, a zero transmission power is allocated to a femtocell if its estimated transmission power is less than a minimum transmission power.

According to a variant of the second and third embodiments, when a zero transmission power is attributed to a femtocell, a terminal is attached to this femtocell and the terminal is in the process of communicating, a transfer procedure is initiated so that this terminal attaches either to another femtocell situated close by or to which it is authorised to attach itself or to a base station in the macrocellular network.

According to a variant, this femtocell switches off its radio part but remains connected to the network in order to be able to be taken into account during a new optimisation of the transmission powers of the femtocells and a non-zero transmission power is allocated to it.

According to one embodiment, the steps of the method are performed periodically and/or when the traffic on these femtocells is low and/or as soon as the central facility detects that a new femtocell is connected to the network or a femtocell is no longer connected to the network.

According to a centralised implementation of the method, the step of taking measurements comprises a substep of taking measurements common to the femtocells and N successive substeps of taking individual measurements.

Moreover, the method comprises a step of the collection of measurements by the central facility followed by the optimisation step that is implemented by this central facility followed by the allocation step during which the central facility sends to each femtocell a signal that carries the transmission power of this femtocell.

During the substep of taking common measurements, no femtocell sends any signal and each femtocell, referred to as FBSn, performs an RSRP of the received power of a signal that was sent by the base station in the macrocellular network considered dominant by the femtocell FBSn, and/or an RSSI measurement of the sum of the power received from a signal that was sent on the common transmission band by the base station in the macrocellular network considered to be dominant by the femtocell FBSn and the thermal noise surrounding the femtocell FBSn, and, during each substep of taking individual measurements, a femtocell, referred to as FBSm, sends a signal at its maximum power and each of the other (N−1) femtocells, referred to as FBSn, then makes an RSRP measurement of the received power of a signal that was sent by the femtocell FBSm and/or an RSSI measurement that corresponds to the sum of the power received from a signal sent at maximum power by the femtocell FBSm, the received power of a signal that was sent by the base station in the macrocellular network considered to be dominant by the femtocell FBSn and the thermal noise surrounding the femtocell FBSn.

According to a distributed implementation of the method, the step of making measurements comprises a substep of making measurements common to the femtocells and N successive substeps of making individual measurements.

Moreover, the step of making measurements, the optimisation step that is implemented by each femtocell, and the allocation step during which the femtocell replaces its current transmission power by the transmission power thus optimised, are iterated.

During the substep of making common measurements, no femtocell sends any signal and each femtocell, referred to as FBSn, makes an RSSP measurement of the received power of a signal that was sent by the base station in the macrocellular network considered to be dominant by the femtocell FBSn, and/or an RSSI measurement of the sum of the received power of a signal that was sent on the common transmission band by the base station in the macrocellular network considered to be dominant by the femtocell FBSn and the thermal noise surrounding the femtocell FBSn, and, during each substep of making individual measurements, all the femtocells send a signal at the transmission power that was allocated to it at the previous iteration, and a femtocell, referred to as FBSn, then no longer sends any signal and makes (N−1) measurements of the RSRP type of the received power of a signal that was sent by each other femtocell and/or a measurement of the RSSI type that corresponds to the sum of the received power of the signals that were sent by the other femtocells FBSm, the received power of a signal that was sent by the base station in the macrocellular network considered to be dominant by the femtocell FBSn and the thermal noise surrounding the femtocell FBSn.

The present invention also concerns a system for reducing the co-channel interference due to the deployment of N femtocells in a macrocellular network, said system comprising a central facility and at least one femtocell, characterised in that each femtocell comprises means for making measurements of the RSRP and/or RSSI type, and the central facility comprises means for temporally ordering the making of measurements by each of the femtocells.

The present invention also concerns a frame of a signal intended to be sent between a central facility intended for a femtocell in a macrocellular network, said frame comprising an identifier and a command forming a request, characterised in that the identifier serves to identify the frame that the femtocell receives (traceability at the central facility) and in that the command asks the femtocell that receives this frame to satisfy the request:

by performing a measurement of the RSSI type, or by performing a measurement of the RSRP type on at least one base station and/or on at least one femtocell in the network, or by performing a measurement of the RSSI type and a measurement of the RSRP type on the macrocellular base station considered to be dominant by the femtocell, or by sending all the results of measurements obtained during previous receptions of commands as well as its transmission power range, or by transmitting at a power given as a parameter, or by transmitting at its maximum power, or by calculating its transmission power autonomously.

The features of the invention mentioned above, as well as others, will emerge more clearly from a reading of the following description of an example embodiment, said description being given in relation to the accompanying drawings, among which:

FIGS. 5a and 5b show schematically embodiments of the frame of a signal Si that is exchanged between the central facility UC and a femtocell FBSn.

Figure 1:
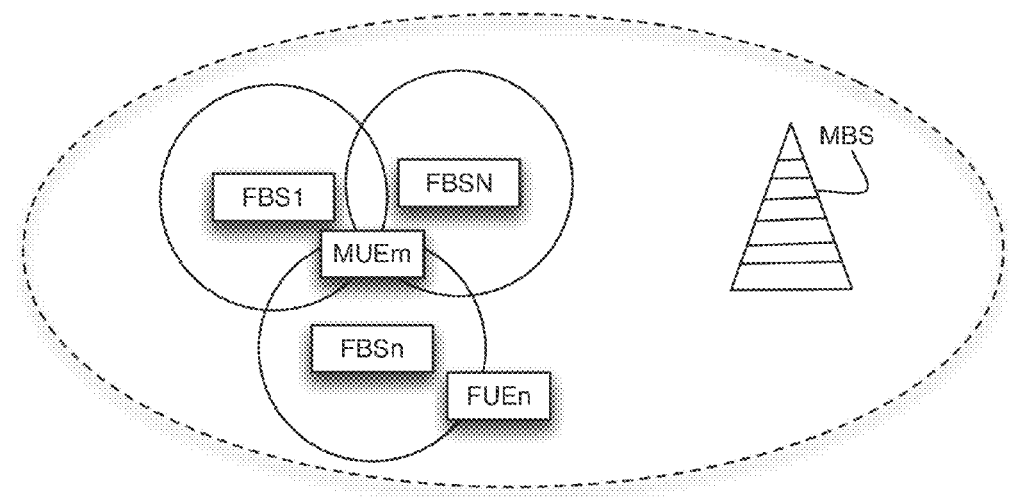
FIG. 1 shows schematically the deployment of femtocells in a macrocellular network.
Figure 2:
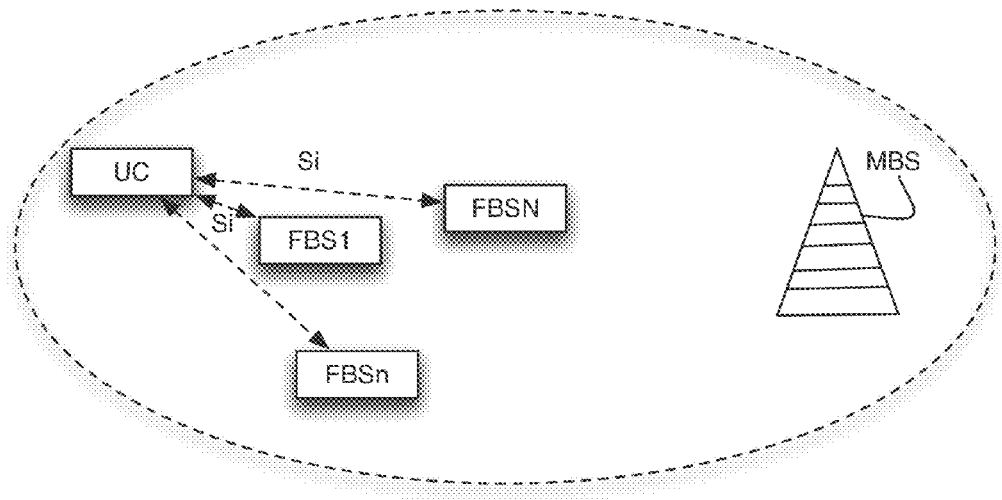
FIG. 2 shows schematically an example of deployment of femtocells in a macrocellular network.

The example of a system in FIG. 2 is given here only by way of illustration. According to this example, the system is formed by a set of N femtocells FBSn deployed under coverage of a macrocellular network here represented by a base station MBS. A restricted-access policy is implemented for the femtocells as explained in the preamble part.

The femtocells interfere with one another but also with the base station MBS since the N femtocells FBSn and the base station MBS use the same transmission frequency band (co-channel deployment).

Each femtocell FBSn is designed to send a signal at a particular transmission power $P_t^n$, which may vary in a power range extending from $P_{min}^n$ to $P_{max}^n$.

In addition, each femtocell FBSn is designed to make two types of power measurement, hereinafter referred to as RSSI and RSRP.

An RSSI (Received Signal Strength Indicator) measurement is a measurement of the power of a signal received by the femtocell FBSn. This signal may be the resultant of several signals sent by one or more other femtocells and/or by one or more base stations in the macrocellular network. This measurement is similar to that defined for the mobile terminals to the standard UMTS/HSPA (*UTRA carrier RSSI*, defined in 3GPP TS 25.215 V9.2.0 (2010-03), "*Physical layer; Measurements (FDD)* (Release 9)", subclause 5.1.3) or the one defined for mobile terminals to the LTE standard (*E-UTRA carrier RSSI*, defined in 3GPP TS 36.214 V9.2.0 (2010-06), "*Evolved Universal Terrestrial Radio Access; Physical layer; Measurements (FDD)* (Release 9)", subclause 5.1.3).

An RSRP (Reference Signal Received Power) measurement is a measurement of the power of a signal that was received by a femtocell and was sent either by another particular femtocell or by a particular base station in the macrocellular network. An RSRP measurement is done, for example, on a channel where reference signals are always sent by a base station in the macrocellular network or a femtocell. In UMTS/HSPA, an RSRP measurement is defined for a mobile terminal (*CPICH RSCP*, defined in 3GPP TS 25.215 V9.2.0 (2010-03), "*Physical layer; Measurements (FDD)* (Release 9)", subclause 5.1.1) while in LTE this measurement is defined for a base station (*DL RS TX power*, defined in 3GPP TS 36.214 V9.2.0 (2010-06), "*Evolved Universal Terrestrial Radio Access; Physical layer; Measurements (FDD)* (Release 9)", subclause 5.2.1).

When a femtocell FBSn makes measurements of the RSSI type or of the RSRP type on its transmission band, it does not transmit at the same time, otherwise it would measure its own transmission, the level of which would be so high that it would dazzle it.

The femtocells FBSn are connected to a central facility UC which may, for example, be either a computer or a femtocell gateway, or a "master" femtocell insofar as the latter can address the other femtocells in the network. In LTE, the base stations can communicate directly with one another (that is to say without passing through a facility of the core network of the mobile telephony operator) by means of an interface called X2. The physical carrier of the X2 interface is not explicitly defined, but only its logic functions. This interface may serve for example to exchange data with a view to cooperation or to ensure continuity of service when a terminal moves and it must change base station during communication (handover). The femtocells may therefore be connected to one another and/or be connected to the central facility UC.

The connection between a femtocell FBSn and the central facility UC, which may be either cabled or wireless, affords bidirectional communication of a signal Si, the frames of which are described in relation to FIGS. 5a and 5b.

The central facility UC is designed to determine which are the femtocells which are connected to the network, in order to determine the number N of femtocells the transmission power of which must be optimised. This is because, as each femtocell must register at each of its start-ups, the central facility UC has knowledge of the addition of any new femtocell and may thus regularly test whether a femtocell is in activity. The central facility UC can then determine by means of this mechanism whether a femtocell is newly connected to the network or is no longer connected to the network.

According to one of its aspects, the present invention concerns a method for reducing co-channel interference due to the deployment of N femtocells in a macrocellular network. This method comprises a step 1 of making measurements of power of signals sent over this network, a step 3 of optimisation of the transmission powers of the femtocells according to these measurements and a step 4 of allocating to each femtocell its transmission power.

During step 1 of making measurements, the power measurements are only made by the femtocells and these measurements are ordered temporally by the central facility UC. In addition, during the optimisation step 3, the transmission powers of the N femtocells are maximised subject to constraints of maintaining a minimum quality of service of the terminals MUEm that would be attached to the base stations in the macrocellular network. These constraints are established by means of the measurements of step 1.

Thus the quality of service for the terminals FUEn (which would be attached to the femtocells) is therefore not taken into account in the constraints, as was done in the prior art. This has only a little effect on the functioning of a terminal FUEn which, if it does not have a good quality of service when it is attached to a femtocell FBSn, can attach to a base station in the macrocellular network so that the quality of service that it perceives increases.

The quality of service of the terminals FUEn is carried by the cost function to be maximised at step 3, which is expressed by:

$$\max_{P_t^n} c = \sum_{n=1}^{N} P_t^n \qquad (6)$$

where $P_t^n$ is the transmission power of the femtocell FBSn.

The optimisation is done under the constraint of maintaining a minimum quality of service for a terminal MUEm in the vicinity of each femtocell FBSn. In order to dispense with the presence of one or more terminals MUEm in the network for establishing constraints, as is the case in the prior art (equation (4)), the measurement capacities of the femtocells FBSn are contributed to establish a quality of service constraint for a virtual terminal MUEm that would be situated in the vicinity of the femtocell FBSn.

The measurements being made by the femtocell FBSn, a coefficient ρ is introduced in order to take into account the difference in position of the virtual terminal MUEm and the femtocell FBSn. This coefficient represents the attenuation of the transmission power coming from the femtocell FBSn in the presence of a slight movement of the measurement point (representing the virtual terminal MUEm). During this movement, the worst case is envisaged, namely that, if the virtual terminal MUEm moves away from the femtocell FBSn, it approaches all the other femtocells FBSm and the macrocellular base station: the attenuation ρ associated with the power of the femtocell. FBSn is then seen as again equal to 1/ρ vis-à-vis the other power sources. This coefficient may be equal to one, which then corresponds to a positioning of the virtual terminal MUEm exactly at the femtocell FBSn.

Finally, the constraint of a virtual terminal MUEm in the vicinity of each femtocell FBSn, which is deduced from the constraint of a terminal MUEm from equation (4) ignoring the thermal noise, is given by:

$$\forall n \in \{1, N\}, P_t^n + \sum_{m \neq n} \frac{\alpha_{n,m}}{\rho^2} P_t^m \leq \frac{P_r^{n,macro}}{\rho^2 \gamma_{MUE}^{target}} - \sigma_n^2 \leq \frac{P_r^{n,macro}}{\rho^2 \gamma_{MUE}^{target}} \quad (7)$$

where $P_t^n$ is the transmission power of a femtocell FBSn, $P_t^m$ is the transmission power of a femtocell FBSm, $\alpha_{n,m}$ is the coefficient of attenuation due to the channel separating a femtocell FBSm from the femtocell FBSn, $P_r^{n,macro}$ is the power received by the femtocell FBSn from a signal that was sent by the base station in the macrocellular network considered to be dominant by the femtocell FBSn, and $\sigma_n^2$, is the power of the surrounding thermal noise perceived by the femtocell FBSn (ignored hereinafter).

The coefficient ρ represents the coverage of a femtocell FBSn beyond which a terminal MUEm would see an SINR greater than $\gamma_{MUE}^{target}$.

Moreover, it is not necessary to know the distances between the femtocells and between femtocells and base stations in the macrocellular network since the coefficients of attenuation are derived, as will be seen hereinafter, from power measurements taken by the femtocells.

However, adding the exact knowledge of the topology of the network of femtocells and the macrocellular base stations at the femtocell FBSn makes it possible to refine the constraint related to a movement around the latter.

Thus moving away from the position of the virtual terminal MUEm with respect to the femtocell FBSn does not necessarily cause a movement towards the other femtocells FBSm and the base stations in the macrocellular network (then seen as a gain), but may cause a moving away from certain femtocells FBSm or certain base stations and therefore be perceived by the virtual terminal MUEm as an attenuation of the received power coming from the latter.

According to a variant, the estimated transmission powers of the femtocells are weighted during their optimisation, that is to say the problem of maximisation under constraint is expressed by:

$$\max_{P_t^n} c = \sum_{n=1}^{N} c_n * P_t^n \quad (8)$$

with $c_n$ weighting coefficients.

This variant makes it possible to hierarchise the importance given to each of the femtocells in order, for example, to provide a higher quality of service to some of them.

If a single femtocell is considered in the network, then the solution of equation (6) or (8) under the constraint of equation (7) is given by:

$$\hat{P}_t^n = \frac{P_r^{n,macro}}{\rho^2 \gamma_{MUE}^{target}} \quad (9)$$

that is to say the estimated transmission power of the femtocell FBSn is fixed at a value calculated from the measurement of the power received by the femtocell FBSn from a signal that is sent by the base station in the macrocellular network that is considered to be dominant by the femtocell FBSn.

According to a first embodiment of step 4, the transmission power of a femtocell is equal to the transmission power estimated during step 3 and cannot exceed the extreme values of the range of power values of this femtocell.

According to a second embodiment of step 4, a zero transmission power is allocated to a femtocell if its transmission power estimated during step 3 is zero.

According to a third embodiment of step 4, a zero transmission power is allocated to a femtocell if its transmission power estimated during step 3 is lower than its minimum transmission power.

The first embodiment of step 4 is recommended in the case of the use of a restricted access policy in which an independent list CSG is associated with each femtocell, while the second and third embodiments of step 4 are recommended in the case of the use of a restricted access policy in which a list CSG common to the femtocells is used.

According to a variant of the second and third embodiments, when a zero transmission power is allocated to a femtocell, a terminal is attached to this femtocell and the terminal is in the process of communicating, a handover procedure is initiated so that this terminal attaches itself either to another femtocell situated close by and to which it is authorised to attach itself or to a base station in the macrocellular network. As long as this procedure has not succeeded, the femtocell must not modify its transmission power.

According to a variant of step 4, if a zero transmission power is allocated to a femtocell, this femtocell switches off its radio part but remains connected to the network so as to be able to be taken into account during a new optimisation of the transmission powers of the femtocells and a non-zero transmission power is allocated to it.

Switching off the radio part of a femtocell is obviously possible only if no terminal currently communicating is attached to it.

Switching off the radio part of the femtocells allows random deployment of the latter in the macrocellular network since, as soon as a femtocell greatly interferes with the functioning of the macrocellular network, this femtocell is switched off, without any human intervention. In addition, switching off the radio part of a femtocell from time to time affords a reduction in the consumption thereof.

According to one embodiment, the steps of the method of reducing the interference are performed periodically and/or when the traffic on these femtocells is low, for example at night and/or as soon as the central facility UC detects that a new femtocell is connected to the network or that a femtocell is no longer connected to the network.

Figure 3:
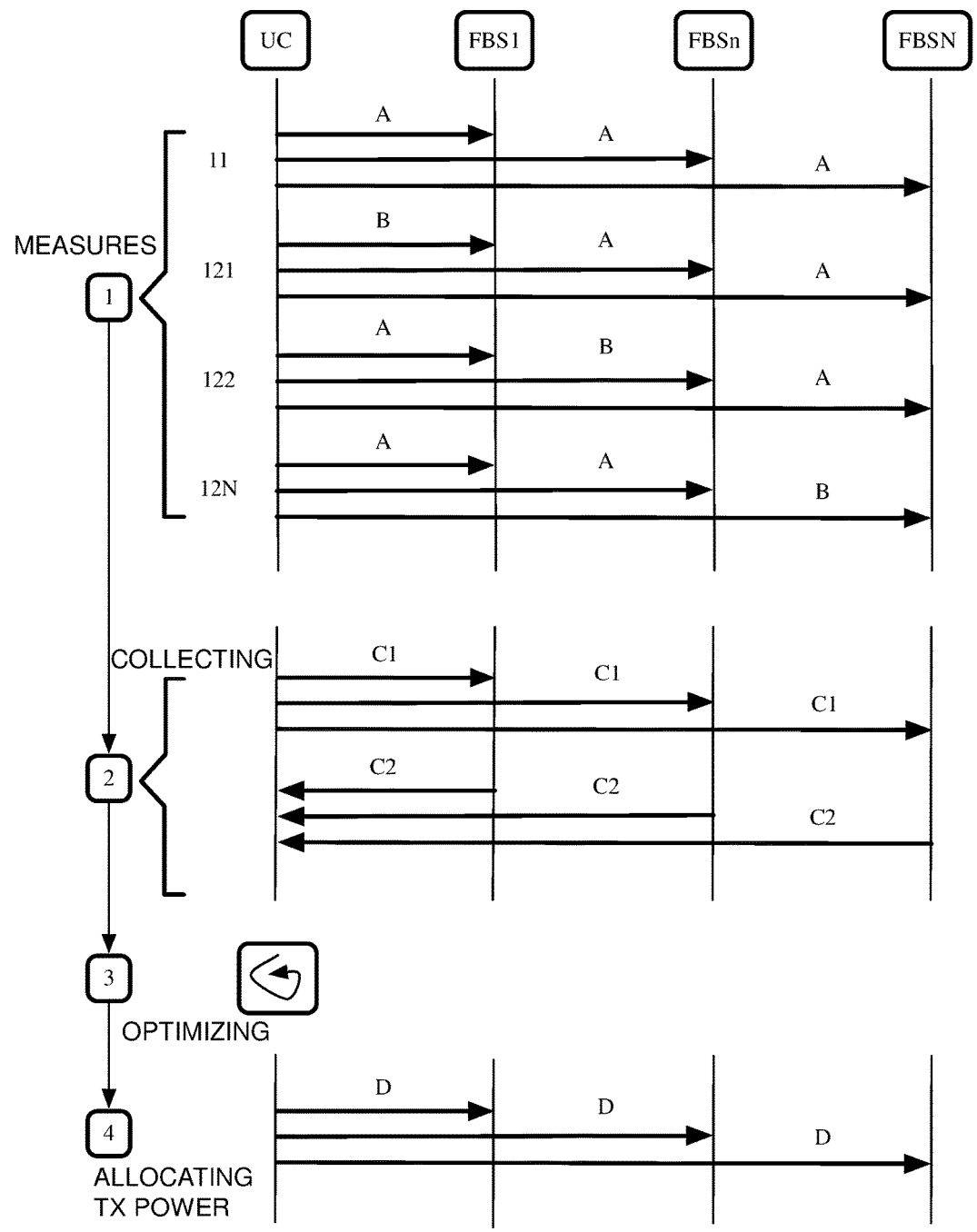
FIG. 3 shows an illustration of a centralised implementation of the method.

FIG. 3 shows an illustration of a centralised implementation of the method.

Step 1 of taking measurements comprises a substep 11 of taking measurements common to the femtocells and N successive substeps 12m of taking individual measurements.

During the substep 11 of taking measurements common to the femtocells, the central facility UC sends N requests A, each intended for one of the N femtocells. Each request A indicates to a femtocell FBSn that it should make a measurement of the RSRP type of a particular base station and/or a measurement of the RSSI type. When it performs the measurement or measurements requested, the femtocell FBSn sends no signal over the common transmission band. Thus, when the N requests A have been sent by the central facility UC, no femtocell sends a signal. The choice of measurement (RSSI and/or RSRP) is specified in each request A.

Following a measurement of the RSRP type on the macrocellular network by a femtocell FBSn, denoted $RSRP_n^0$, the femtocell FBSn obtains the received power coming from the macrocellular network only, that is to say a measurement of the power received from a signal that was sent on the common transmission band by the base station in the macrocellular network considered to be dominant by the femtocell FBSn ($P_r^{n,macro}$).

Following a measurement of the RSSI type by a femtocell FBSn, denoted $RSSI_n^0$, the femtocell FBSn obtains the sum of the power received from a signal that was sent on the common transmission band by the base station in the macrocellular network considered to be dominant by the femtocell FBSn ($P_r^{n,macro}$), and the thermal noise surrounding the femtocell FBSn ($\sigma_n^2$).

During a substep 12m, the central facility UC sends a request B to a femtocell FBSm. The request B indicates to the femtocell FBSm that it should send a signal at its maximum power $P_{max}^m$ and the central facility UC sends a request A to each of the other (N−1) femtocells in order to indicate to it that it should make measurements. Thus, following the sending of a request B and (N−1) requests A, a femtocell FBSm transmits at its maximum power while each other femtocell FBSn makes an RSRP measurement of the femtocell FBSm, denoted $RSRO_n^m$, that is to say a measurement of the power received from a signal that was sent by the femtocell FBSm ($RSRP_n^m = \alpha_{n,m} P_{max}^m$) and/or a measurement of the RSSI type, denoted $RSSI_n^m$, which corresponds to the sum of the power received from a signal sent at maximum power by the femtocell FBSm, the power received from a signal that was sent by the base station in the macrocellular network considered to be dominant by the femtocell FBSn) ($P_r^{n,macro}$) and the thermal noise surrounding the femtocell FBSn.

Thus, at substep 121 in FIG. 3, the central facility UC sends a request B to the femtocell FSB1 indicating that it should send a signal at its maximum power and a request A to each other femtocell FBSn in order to indicate to it not to send a signal on the transmission band and to make measurements. In a similar way, at substep 122, the central facility UC sends a request B to the femtocell FBS2 indicating to it that it should send a signal at its maximum power and a request A to each other femtocell FBSn in order to indicate to it not to send a signal on the transmission band and to make measurements, etc.

According to one embodiment of step 1 of taking measurements, each femtocell FBSn makes, during the substep 11, a measurement $RSRP_n^0$ and, during each substep 12m, a measurement $RSRP_n^m$, (except at step 12n, where the femtocell FBSn must send at full power). These measurements and their relationships with the parameters used in the generation of constraints are given below:

$$\begin{cases} RSRP_n^0 = P_r^{n,macro} \\ \forall m \neq n, RSRP_n^m = \alpha_{n,m} P_{max}^m \end{cases} \quad (10)$$

According to a preferred embodiment of step 1 of taking measurements, each femtocell FBSn makes, during substep 11, a measurement $RSRR_n^0$ and a measurement $RSSI_n^0$ and, during each substep 12m, a measurement $RSSI_n^m$ (except at step 12n, where the femtocell FBSn must send at full power). These measurements and their relationships with the parameters used in the generation of the constraints are given below:

$$\begin{cases} RSRP_n^0 = P_r^{n,macro} \\ RSSI_n^0 = P_r^{n,macro} + \sigma_n^2 \\ \forall m \neq n, RSSI_n^m = \alpha_{n,m} P_{max}^m + P_r^{n,macro} + \sigma_n^2 = \alpha_{n,m} P_{max}^m + RSSI_n^0 \end{cases} \quad (11)$$

The embodiment is advantageous since it is preferable to make one RSRP measurement and N RSSI measurements rather than N RSRP measurements in order to reduce the total duration of the taking of measurements while obtaining the same parameters used in the generation of the constraints. This is because, in practice, a measurement of the RSSI type is performed much more quickly than an RSRP measurement.

This embodiment is also advantageous since the appearance or disappearance of a femtocell in the network has little impact since RSSI measurements are taken to measure the co-channel interferences overall rather than RSRP measurements, which would individually involve this femtocell in the network.

According to one embodiment of the step of taking measurements, the number of measurements to be made by a femtocell FBSn is limited to a predefined value VA. In this case, only the measurements of the femtocell VAs where the powers received by the femtocell FBSn are the greatest are considered. The other measurements not received by the femtocell FBSn are set to zero in the linear system.

Step 1 of taking measurements is followed by step 2 of the collecting of measurements by the central facility UC. For this purpose, the central member UC sends a request to each femtocell (referenced C1 in FIG. 3), which in response sends to it the measurements that it has taken (referenced C2 in FIG. 3).

Step 2 is follows by the step 3 of optimising the transmission powers of the femtocells according to the measurements collected. This step 3 is implemented by the central facility UC as illustrated in FIG. 3 by the rectangle that encompasses the arrow.

During step 3, the central facility UC calculates the coefficients of attenuation $\alpha_{n,m}$ from the measurements taken and using either equation (10) or equation (11) depending on the embodiment used. The central facility UC then forms the following system from equation (8) and the constraints of equation (7) for each femtocell FBSn:

$$\max C^T P \text{ under the constraint } AP \leq B \quad (12)$$

with $$P = \begin{pmatrix} P_t^1 \\ P_t^2 \\ \vdots \\ P_t^N \end{pmatrix}$$

the vector of the estimated transmission powers of the N femtocells, $$C = \begin{pmatrix} c_1 \\ c_2 \\ \vdots \\ c_n \end{pmatrix}$$

the weighing coefficients vector, $$A = \frac{1}{\rho^2} \begin{pmatrix} \rho^2 & \alpha_{1,2} & \cdots & \alpha_{1,N} \\ \alpha_{2,1} & \rho^2 & \cdots & \alpha_{2,N} \\ \vdots & \vdots & \ddots & \vdots \\ \alpha_{N,1} & \cdots & \alpha_{N,N-1} & \rho^2 \end{pmatrix}$$

a square matrix of N rows and N columns, $$B = \frac{1}{\rho^2 \gamma_{MUE}^{target}} \begin{pmatrix} P_r^{1,macro} \\ P_r^{2,macro} \\ \vdots \\ P_r^{N,macro} \end{pmatrix}$$

the constraints vector.

It may be noted that the vector C is composed only of 1 if the system is formed from equation (6).

The problem described by equation (12) is a problem of linear optimisation where the unknowns to be found are positive (transmission powers). The central facility UC can then attempt to solve this linear system using a solution method, of the simplex method type, in order to estimate the N transmission powers $\{\hat{P}_t^n\}_{1 \leq n \leq N}$.

If the solution method finds an N-tuplet solution, the transmission power $P_t^n$ that would be allocated to a femtocell FBSn according to the first embodiment of step 4 complies with the following constraints:

$$\forall n \in [1, N], P_t^n = \begin{cases} P_{max}^n & \text{if } P_{max}^n < \hat{P}_t^n \\ P_{min}^n & \text{if } \hat{P}_t^n < P_{min}^n \\ \hat{P}_t^n & \text{otherwise} \end{cases} \quad (13)$$

If the solution method finds an N-tuplet solution, the transmission power $P_t^n$ that will be allocated to a femtocell FBSn according to the second embodiment of step 4 complies with the following constraints.

$$\forall n \in [1, N], P_t^n = \begin{cases} P_{max}^n & \text{if } P_{max}^n < \hat{P}_t^n \\ \max(\hat{P}_t^n, P_{min}^n) & \text{if } 0 < \hat{P}_t^n \leq P_{max}^n \\ 0 & \text{if } \hat{P}_t^n = 0 \end{cases} \quad (14)$$

If the solution method finds an N-tuplet solution, the transmission power $P_t^n$ that will be allocated to a femtocell FBSn according to the third embodiment of step 4 complies with the following constraints:

$$\forall n \in [1, N], P_t^n = \begin{cases} P_{max}^n & \text{if } P_{max}^n < \hat{P}_t^n \\ \hat{P}_t^n & \text{if } P_{min}^n \leq \hat{P}_t^n \leq P_{max}^n \\ 0 & \text{otherwise} \end{cases} \quad (15)$$

If the solution method does not find an N-tuplet solution, the transmission power $P_t^n$ that will allocated to a femtocell FBSn according to a fourth embodiment of step 4 complies with the following constraints:

$$\forall n \in [1,N], P_t^n = P_{max}^n \quad (16)$$

In addition, during this step 4, the central facility UC sends to each femtocell FBSn a signal (referenced D in FIG. 3) that carries the transmission power $P_t^n$ thus determined.

Once this signal is received, a femtocell FBSn then transmits at this new power level.

Figure 4:
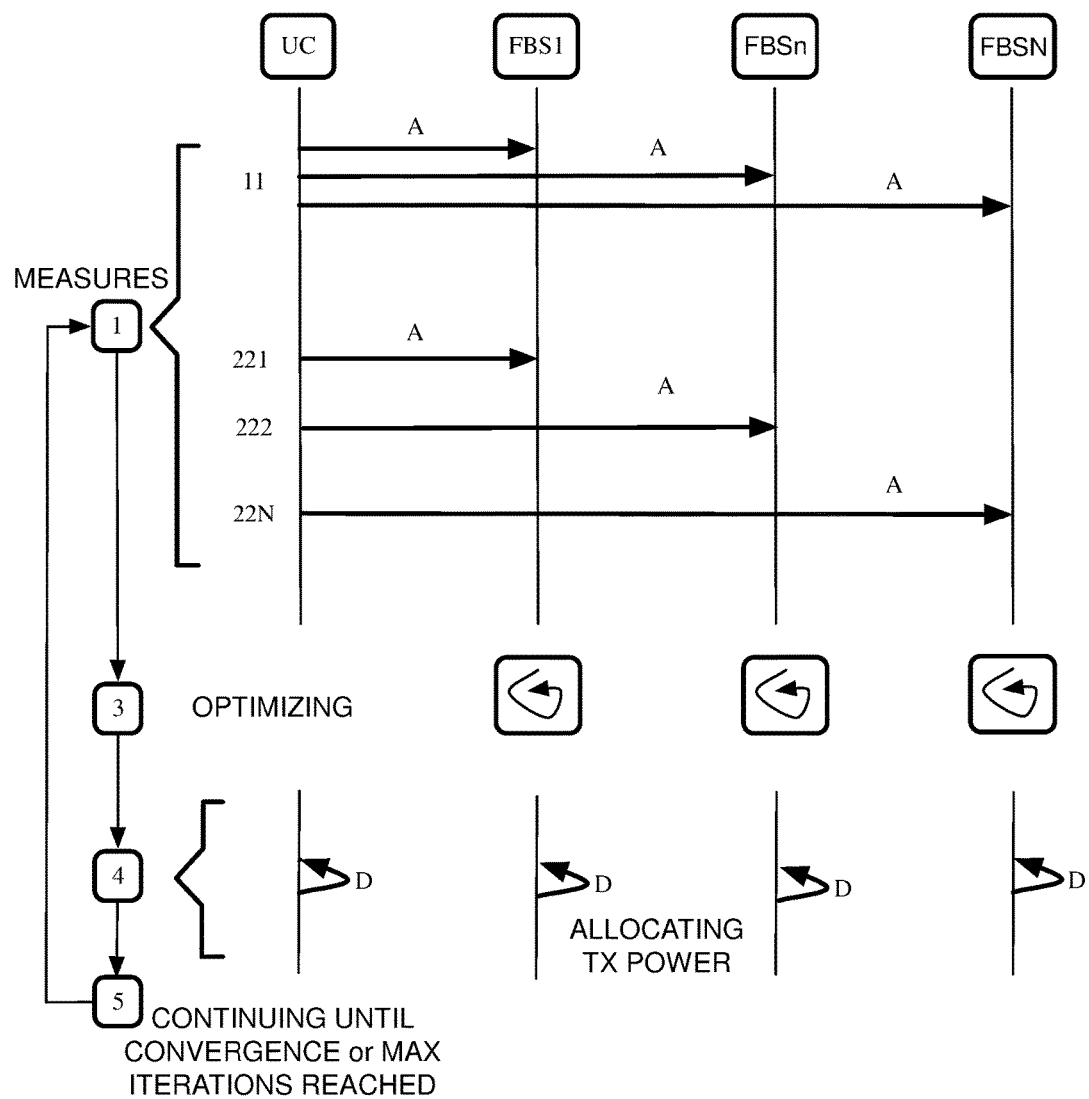
FIG. 4 shows an illustration of a distributed implementation of the method.

FIG. 4 shows an illustration of a distributed implementation of the method.

According to this implementation, the method is iterative, that is to say steps 1, 3 and 4 are performed at each iteration i. The method stops either when a maximum number of iterations is reached or when the optimisation of the transmission powers has converged towards a solution.

One of the advantages of this embodiment is that it does not require the transfer of measurements taken by a femtocell since the optimisation of the transmission power of a femtocell is calculated by this femtocell from the measurements that this femtocell has taken.

Step 1 of taking measurements comprises the substep 11 of taking measurements common to the femtocells that was described in relation to FIG. 3 and N successive substeps of individual measurement taking 22n.

During a substep 22n, the central facility UC sends a request (referenced A) to a femtocell FBSn to perform measurements (and therefore no longer to transmit). Thus, during the transmission, a request A is sent to a femtocell FBSn, each femtocell FBSm (n) continues to function normally and sends its reference channels/signals at the transmission power that was allocated to it at the previous iteration $P_t^m[i-1]$ while the femtocell FBSn, which is then no longer transmitting, makes (N−1) RSRP measurements of the other femtocells FBSm, denoted $RSRP_n^m$, that is to say a measurement of the received power of a signal that was sent by each other femtocell FBSm ($\alpha_{n,m} P_t^m[i-1]$) and/or a measurement of the RSSI type, denoted $RSSI_n^m$, that corresponds to the sum of the received power of the signals that were sent at the power $P_t^m[i-1]$ by the other femtocells FBSm, the received power of a signal that was sent by the base station in the macrocellular network considered to be dominant by the femtocell FBSn ($P_r^{n,macro}$) and the thermal noise surrounding the femtocell FBSn.

Thus, at substep 221, the central facility UC sends a request A to the femtocell FBS1 indicating to it to make measurements, at substep 222 the central facility UC sends a request A to the femtocell FBS2 indicating to it to make measurements, etc.

According to one embodiment of the measurement-taking step 1, each femtocell FBSn makes, during substep 11, a measurement $RSRP_n^0$ and, during substep 22n, (N−1) measurements $RSRP_n^m$. During the steps 22m (m≠n), the femtocell. FBSn continues to function normally. These measurements and their relationships with the coefficients of attenuation are given below:

$$\begin{cases} RSRP_n^0 = P^{n,macro} \\ \forall\, m \neq n,\ RSRP_n^m = \alpha_{n,m} P_t^m[i-1] \end{cases} \quad (17)$$

According to a preferred embodiment of the measurement-taking step 1, each femtocell FBSn performs, during substep 11, a measurement $RSRP_n^0$ and a measurement $RSSI_n^0$ and, during substep 22n, a measurement $RSSI_n^n$. During steps 22m (m≠n), the femtocell FBSn continues to function normally. These measurements and their relationships with the coefficients of attenuation are given below:

$$\begin{cases} RSRP_n^0 = P_r^{n,macro} \\ RSSI_n^0 = P_r^{n,macro} + \sigma_n^2 \\ RSSI_n^n = \sum_{n \neq m} \alpha_{n,m} P_t^m[i-1] + P_r^{n,macro} + \sigma_n^2 = \sum_{n \neq m} \alpha_{n,m} P_t^m[i-1] + RSSI_n^0 \end{cases} \quad (18)$$

This embodiment is advantageous since it is preferably to make two RSSI measurements and one RSRP measurement rather than N RSRP measurements in order to reduce the total duration of the measurement taking. This is because, in practice, a measurement of the RSSI type is carried out much more quickly than an RSRP measurement.

This embodiment is also advantageous since the appearance or disappearance of a femtocell in the network has little impact since RSSI measurements are taken to measure the co-channel interferences overall rather than RSRP measurements that would individually involve this femtocell in the network.

Request A of step 22n intended for the femtocell FBSn also comprises a timer at the end of which the femtocell FBSn will calculate its transmission power (step 3).

Step 1 is thus followed by step 3 of optimisation of the transmission powers of the femtocells according to the measurements taken. This step 3 is implemented by each femtocell FBSn as illustrated in FIG. 4 by rectangles, which each surround an arrow, as soon as the timer associated with request A and received at step 22n has reached a defined value.

According to the preferred embodiment of step 4, each femtocell FBSn updates its transmission power according to the following equation (19) derived from equation (8), considering that the constraints of equation (7) are equalities. A solution of this problem according to the Jacobi approach gives, at iteration i for the femtocell FBSn:

$$\hat{P}_t^n[i] = b_n - \sum_{n \neq m} a_{n,m} P_t^m[i-1] \quad (19)$$

$$= \frac{1}{\rho^2}\left(\frac{RSRP_n^0}{\gamma_{MUE}^{target}} + RSSI_n^0 - RSSI_n^m\right)$$

with $a_{n,m} = \frac{\alpha_{n,m}}{\rho^2}$ and $b_{n,m} = \frac{P_r^{n,macro}}{\rho^2 \gamma_{MUE}^{target}}$.

According to the preferred embodiment of step 1, the first equality of equation (19) is used since all the parameters are defined by means of equation (17).

According to the second preferred embodiment of step 1, the second equality of equation (19) is used since all the parameters are defined by means of equation (18).

Other approaches can be used to determine the transmission power of a femtocell FBSn, such as a Gauss-Seidel or successive overrelaxation (SOR) approach.

The expression of the power of the femtocell FBSn at iteration i, when these approaches are used, remains roughly the same. If it is considered that the femtocells update their power during iteration i in increasing order of their index (from 1 to N), then the solving of this problem according to the Gauss-Seidel approach gives, at iteration i for the femtocell FBSn:

$$\hat{P}_t^n[i] = b_n - \sum_{m<n} a_{n,m} P_t^m[i] - \sum_{n<m} a_{n,m} P_t^m[i-1] \quad (20)$$

$$= \frac{1}{\rho^2}\left(\frac{RSRP_n^0}{\gamma_{MUE}^{target}} + RSSI_n^0 - RSSI_n^m\right)$$

and the solution of this problem according to the SOR approach gives, at iteration i for the femtocell FBSn:

$$\hat{P}_t^n[i] = (1-\omega)P_t^n[i] + \omega\left(b_n - \sum_{m<n} a_{n,m} P_t^m[i] - \sum_{n<m} a_{n,m} P_t^m[i-1]\right) \quad (21)$$

$$= (1-\omega)P_t^n[i] + \frac{\omega}{\rho^2}\left(\frac{RSRP_n^0}{\gamma_{MUE}^{target}} + RSSI_n^0 - RSSI_n^m\right)$$

where $\omega$ is the overrelaxation parameter to be defined.

Depending on the solution method used, the femtocell FBSn can either directly update its transmission power after having made the request of step 22n according to equation (20) or (21) (the Gauss-Seidel or SOR case), or wait until all of steps 22m (m≠n) are performed before updating its power according to equation (20) (Jacobi case). The presence of the timer in request A allows this waiting.

The central facility UC can also sent a request for autonomous updating of the power if no timer is included in request A of step 22n.

In the case of this distributed implementation of the method, the transmission power $P_t^n[i]$ that will be allocated for the following iteration i to a femtocell FBSn according to the first embodiment of step 4 complies with the following constraints:

$$P_t^n[i] = \begin{cases} P_{max}^n & \text{if } P_{max}^n < \hat{P}_t^n[i] \\ P_{min}^n & \text{if } \hat{P}_t^n[i] < P_{min}^n \\ \hat{P}_t^n[i] & \text{otherwise} \end{cases} \quad (22)$$

In the case of this distributed implementation of the method, the transmission power $P_t^n[i]$ that will be allocated for the following iteration i to a femtocell FBSn according to the second embodiment of step 4 complies with the following constraints:

$$P_t^n(i) = \begin{cases} P_{max}^n & \text{if } P_{max}^n < \hat{P}_t^n[i] \\ \max(\hat{P}_t^n[i], P_{min}^n) & \text{if } 0 < \hat{P}_t^n[i] \leq P_{max}^n \\ 0 & \text{if } \hat{P}_t^n[i] = 0 \end{cases} \quad (23)$$

In the case of this distributed implementation of the method, the transmission power $P_t^n[i]$ that will be allocated for the following iteration i to a femtocell FBSn according to the third embodiment of step 4 complies with the following constraints:

$$P_t^n[i] = \begin{cases} P_{max}^n & \text{if } P_{max}^n < \hat{P}_t^n[i] \\ \hat{P}_t^n[i] & \text{if } P_{min}^n \le \hat{P}_t^n[i] \le P_{max}^n \\ 0 & \text{otherwise} \end{cases} \quad (24)$$

According to one embodiment, the transmission power of a femtocell FBSn is initialised to $$P_t^n[0] = \frac{P_r^{n,macro}}{\rho^2 \gamma_{MUE}^{target}}.$$

In addition, according to this distributed implementation of the method, during this step 4, the power value $P_t^n[i]$ thus determined for this femtocell is used by this femtocell to send signals (reference D in FIG. 4).

The central facility UC and each femtocell communicate with each other information carried by the signal Si. By means of this signal Si, the central facility UC orders that measurements be made by the femtocells (request A) or that a femtocell emits its maximum power (request B) and transmits the powers at which the femtocells must send (request D), and the femtocells transmit to the central facility UC the results of the measurements that they have made and their ranges of power values (response C2 following a request C1). These exchanges between the femtocells and the central facility UC are ordered temporally according to the method described in relation to FIGS. 3 and 4, the implementation of which uses a communication protocol using a logic interface based on a physical interface that may be cabled or wireless.

The frame of the signal Si comprises, among other things, an identifier ID and a command CMD when this signal is a request R sent by the central facility UC to a femtocell and an item of information INFO when this signal is a response RE from a femtocell to the central facility UC as illustrated in FIG. 5a. It may be noted that a response RE always relates to a previously sent request. This request is sent by an identifier that is here denoted R.ID in order to indicate that the information INFO in the response RE refers to a previous request R that was received by a particular femtocell. In addition, if the information INFO relates to several previous requests, each item of information relates to the identifier of the request to which this information corresponds.

This identifier R.ID enables the central facility UC to discriminate the responses when the femtocell integrates this identifier R.ID in its response and the central facility UC keeps a trace of its request. The identifier ID of a request enables a femtocell to know what behaviour it must adopt following the reception of this request. The command CMD and the information INFO are accompanied or not by a parameter PA.

FIG. 5b illustrates embodiments of the frames of the signal Si that are used to construct the requests A, B, C1 and D and the response C2 and of the method described in relation to FIGS. 3 and 4.

The request REQ1 comprises its own identifier and the command CMD1 which requests the femtocell that receives this request to make a measurement of the RSSI type. The request REQ1 is equivalent to a request A.

The request REQ2 comprises a particular specific identifier and the command CMD2 that requests the femtocell that receives this request to make a measurement of the RSRP type. This command CMD2 is associated with at least one parameter that indicates to which base stations MBS and/or femtocells FBSn this measurement should relate. The request REQ2 is equivalent to a request A.

The request REQ3 comprises its own identifier and the command CMD3 that requests the femtocell FBSn that receives this request to make a measurement of the RSSI type and a measurement of the RSRP type of the macrocellular base station considered to be dominant by the femtocell FBSn. The request REQ3 is equivalent to a request A.

The request REQ4 comprises its own identifier and the command CMD4 that requests the femtocell that receives this request to return all the results of measurements obtained during the previous reception of commands CDM1, CMD2 or CMD3 as well as its transmission power range. According to one embodiment, the results of measurements, once sent, are deleted from the femtocell. In addition, if the femtocell receives a command CMD4 whereas it has no results of measurements to send, it sends nothing. The request REQ4 is equivalent to a request C1.

The request REQ5 comprises its own identifier and the command CMD5 that requests the femtocell that receives this request to send at a power given as a parameter. The request REQ5 is equivalent to a request D.

The request REQ6 comprises its own identifier and the command CMD6 that requests the femtocell that receives this request is send at its maximum power. The request REQ6 is equivalent to a request B.

The response AN comprises the identifier REQ4.ID of the previous request that triggered this response AN, that is to say the identifier of the request giving rise to the generation of a frame that carriers this response, as well as the parameters corresponding to the information requested by this request (equivalent to a response C1). The information INFO comprises one or more identifiers REQ1.ID that enable the central facility UC to know with which requests REQ1 the following measurements of the RSSI type are associated, and/or one or more identifiers REQ2.ID that enable the central facility UC to know with which requests REQ2 the following measurements of the RSRP type are associated, and/or one or more identifiers REQ3.ID that enable the central facility UC to know with which requests REQ3 the following measurements of the RSSI and RSRP type are associated, and the range of power values of the femtocell FBSn. The association of the identifier of the request REQ1, REQ2 or REQ3 in the information INFO enables the femtocell not to have to send, for each measurement, the identity of the base station/femtocell that is the target of the measurement, the central facility UC making the match by means of the identifiers.

According to one embodiment, this communication protocol is made by means of the protocol TR-069, a protocol defining the communications between an item of equipment deployed at a customer (Customer Premise Equipment), such as a femtocell, and an automatic configuration server. This protocol, defined by Broadband Forum in the technical report "*TR-069 Amendment* 3*: CPE WAN Management Protocol*", Issue 1, November 2010, enables remote generic management of the equipment. The protocol TR-069 also enables the addition of parameters specific to a manufacturer (vendor specific) then giving rise to a clearly determined behaviour when they are received by the equipment and/or the automatic configuration server. Thus it is possible to add requests/responses defined previously to the protocol TR-069 and to program the femtocell/automatic configuration server in order to obtain the desired behaviour when the specific messages are received.

Figure 6:
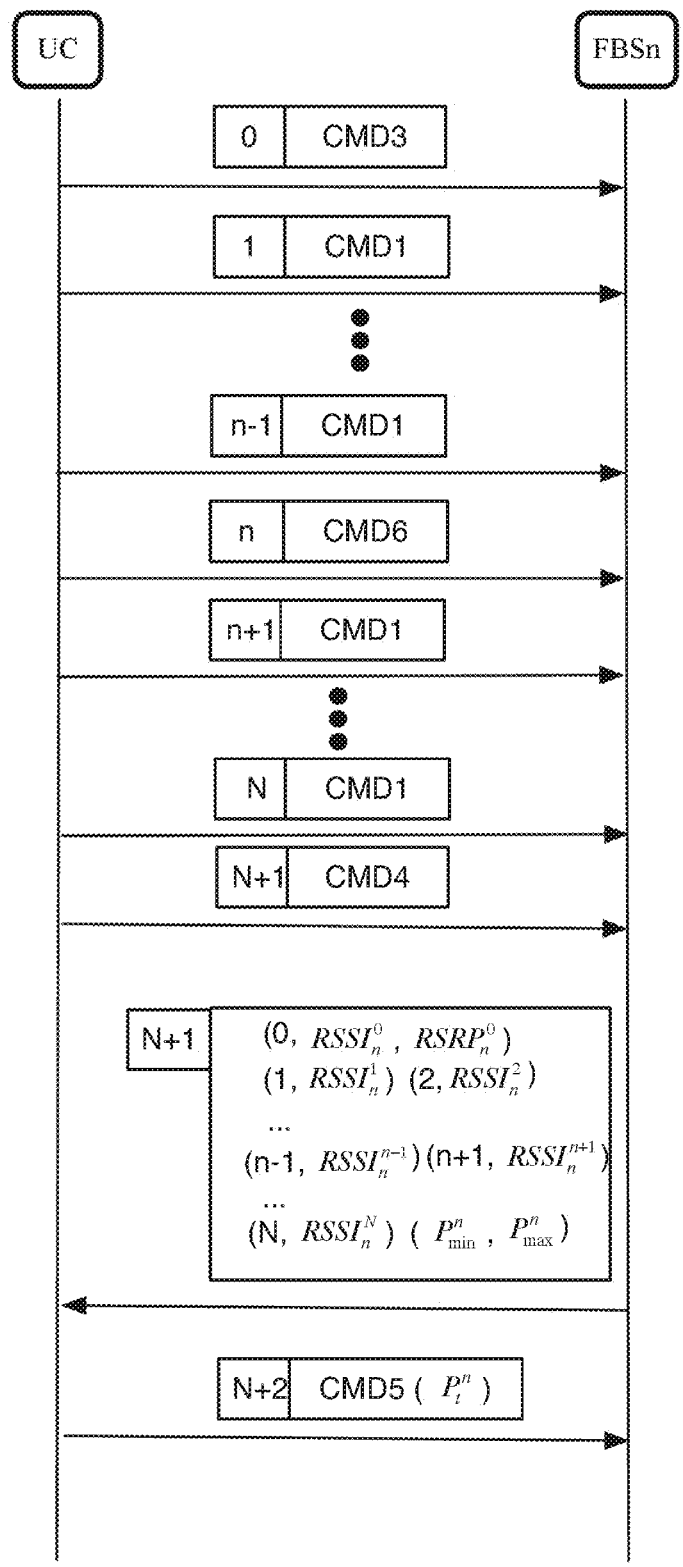
FIG. 6 shows an example of centralised implementation of the preferred embodiment of the method described in relation to FIG. 3 when the signal Si uses frames described in relation to FIGS. 5a and 5b.

FIG. 6 shows an example of centralised implementation of the preferred embodiment of the method described in relation to FIG. 3 when the signal Si uses frames described in relation to FIGS. 5a and 5b.

The central facility sends a request REQ3 to the femtocell FBSn, which then makes a measurement $RSRF_n^0$ and a measurement $RSSI_n^0$ (step 11).

The central facility UC sends (N−1) requests REQ1 to the femtocell FBSn so that it makes (N−1) measurements RSSI$_n^m$ (steps 12m). At each request REQ1, the central facility at the same time sends a request REQ6 to the femtocell FBSn (not shown in FIG. 6).

The central facility UC also sends a request REQ6 to the femtocell FBSn so that the other femtocells FBSm can make their measurements $RSSI_n^m$ (step 12n) in response to a request REQ1 (not shown in FIG. 6).

The central facility UC then sends a request REQ4 for requesting the femtocell FBSn to send it the results of measurements that it made (step 2).

The femtocell then sends a response AN that comprises the measurement $RSRP_n^0$, the measurement $RSSI_n^0$ and the (N−1) measurements RSSI that it has just made as well as its range of power values.

The central facility UC then calculates, among other things, the transmission power of the femtocell FBSn (step 3) and sends a request REQ5 that indicates to the femtocell FBSn the power at which it should henceforth transmit (step 4).

Figure 7:
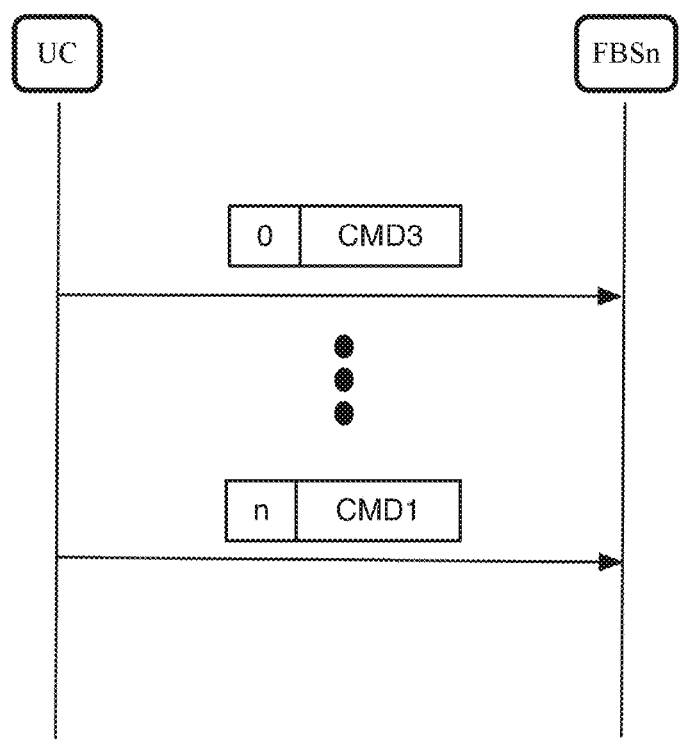
FIG. 7 shows an example of distributed implementation of the preferred embodiment of the method described in relation to FIG. 4 when the signal Si uses frames described in relation to FIGS. 5a and 5b.

FIG. 7 shows an example of distributed implementation of the preferred embodiment of the method described in relation to FIG. 4 when the signal Si uses frames described in relation to FIGS. 5a and 5b.

The central facility UC sends a request REQ3 to the femtocell FBSn, which then makes a measurement $RSRP_n^0$ and a measurement $RSSI_n^0$ (step 11).

The central facility UC then sends a request REQ1 to the femtocell FBSn so that it makes a measurement RSS (step 22n). This request is associated with a timer that indicates to the femtocell FBSn when to calculate its new transmission power.

Once the target value has been reached by the timer, the femtocell FBSn then calculates its transmission power (step 3) and updates its power at which it will henceforth transmit.

The invention claimed is:

1. Method for reducing co-channel interference due to the deployment of N femtocells in a macrocellular network, N being an integer, said method comprising:
taking power measurements on signals sent over this network, during which the power measurements are only taken by the N femtocells and these measurements are ordered temporally by a central facility of the system,
performing optimization of transmission powers of the femtocells according to the taken power measurements, and
performing allocation, to the femtocells, of their respective optimized transmission power,
wherein, during the optimisation of the transmission powers of the femtocells, the transmission powers of the femtocells are maximised under the constraint of maintaining a minimum quality of service of terminals that would be attached, in the macrocellular network, to base stations of the macrocellular network,
wherein, during the optimisation of the transmission powers of the femtocells, the following cost function is maximised:

$$\max_{P_t^n} c = \sum_{n=1}^{N} P_t^n$$

under the following constraint:

$$\forall n \in \{1, N\}, P_t^n + \sum_{m \neq n} \frac{\alpha_{n,m}}{\rho^2} P_t^m \leq \frac{P_r^{n,macro}}{\rho^2 \gamma_{MUE}^{target}} - \sigma_n^2 \leq \frac{P_r^{n,macro}}{\rho^2 \gamma_{MUE}^{target}}$$

where $P_t^n$ is the emission power of a femtocell, referred to as FBSn, $P_t^m$ is the emission power of a femtocell, referred to as FBSm, cu is a weighting coefficient associated with the transmission power of the femtocell FBSn, $\alpha_{n,m}$ is a coefficient of attenuation due to a channel separating the femtocell FBSm from the femtocell FBSn, $P_r^{n,macro}$ is a power received by the femtocell FBSn from a signal that was sent by a base station in the macrocellular network considered to be dominant by the femtocell FBSn, $\sigma_n^2$ is a power of surrounding thermal noise perceived by the femtocell FBSn, $\rho$ is a coefficient that represents the coverage of the femtocell FBSn beyond which a terminal that would be attached to one of the base stations of the macrocellular network would see a signal to interference-plus-noise ratio greater than a threshold value $\gamma_{MUE}^{target}$.

2. Method according to claim 1, in which, during the allocation, the transmission power of a femtocell estimated during the optimisation is limited to extreme values of a range of power values of this femtocell.

3. Method according to claim 1, in which, during the allocation, a zero transmission power is allocated to any one of the femtocells if its transmission power estimated during the optimisation is zero.

4. Method according to claim 1, in which, during the allocation, a zero transmission power is allocated to any one of the femtocells if its estimated transmission power is less than a minimum transmission power.

5. Method according to claim 3, in which, when a zero transmission power is allocated to a femtocell, when a terminal is attached to this femtocell and when the terminal is currently communicating, a transfer procedure is initiated so that this terminal attaches either to another femtocell situated close by and to which the terminal is authorised to attach itself or to one of the base stations of the macrocellular network.

6. Method according to claim 3, in which the femtocells to which a zero transmission power is allocated switches off its radio part but remains connected to the network so as to be able to be taken into account during a new optimisation of the transmission powers of the femtocells and a non-zero transmission power is allocated thereto.

7. Method according to claim 1, in the power measurements, the optimization and the allocation are performed periodically and/or when the traffic on these femtocells is low and/or as soon as the central facility detects that a new femtocell is connected to the network or that a femtocell is no longer connected to the network.

8. Method according to claim 1, in which taking the measurement comprises taking measurements common to the femtocells and further taking N successive individual measurements.

9. Method according to claim 8, which further comprises:
collecting the measurements by the central facility followed by the optimisation that is implemented by the central facility followed by the allocation during which the central facility sends to each femtocell a signal that carries information representing the transmission power of said femtocell.

10. Method according to claim 9, in which, when taking the common measurements, no femtocell sends any signal and each femtocell, referred to as FBSn, performs a Reference Signal Received Power RSRP measurement of received power of a signal that was sent by a base station in the macrocellular network considered dominant by the femtocell FBSn, and/or a Received Signal Strength Indicator RSSI measurement of a sum of received power of a signal that was sent on a common transmission band by the base station in the macrocellular network considered to be dominant by the femtocell FBSn, and a thermal noise surrounding the femtocell FBSn, and, when taking the individual measurements, one of the femtocells, referred to as FBSm, sends a signal at its maximum power and each of the other femtocells, referred to as FBSn, then makes an RSRP measurement of the received power of a signal that was sent by the femtocell FBSm and/or an RSSI measurement that corresponds to the sum of received power of a signal sent at maximum power by the femtocell FBSm, received power of a signal that was sent by the base station in the macrocellular network considered to be dominant by the femtocell FBSn and the thermal noise surrounding the femtocell FBSn.

11. Method according to claim 10, in which, when taking the common measurements, each femtocell FBSn makes an RSRP measurement of the received power of a signal that was sent by the base station in the macrocellular network considered to be dominant by said femtocell FBSn and, when taking the individual measurements, each of the other femtocells then makes an RSRP measurement of the received power of a signal that was sent by the femtocell FBSm.

12. Method according to claim 8, in which taking the measurements, the optimisation that is implemented by each femtocell, and the allocation during which the femtocell replaces its current transmission power by the transmission power thus optimised, are iterated.

13. Method according to claim 12, in which, when taking the common measurements, no femtocell sends any signal and each femtocells, referred to as FBSn, makes an RSRP measurement of the received power of a signal that was sent by the base station in the macrocellular network considered to be dominant by the femtocell FBSn, and/or an RSSI measurement of the sum of the received power of a signal that was sent over the common transmission band by the base station in the macrocellular network considered to be dominant by the femtocell FBSn, and the thermal noise surrounding the femtocell FBSn, and, when taking the individual measurements, all the femtocells send a signal at the transmission power that was allocated thereto at a previous iteration, and one of the femtocells, referred to as FBSn, then does not send a signal and makes RSRP measurements of the received power of a signal that was sent by each other femtocell and/or an RSSI measurement that corresponds to the sum of the received power of the signals that were sent by the other femtocells, the received power of a signal that was sent by the base station in the macrocellular network considered to be dominant by the femtocell FBSn and the thermal noise surrounding the femtocell FBSn.

14. Method according to claim 13, in which, when taking the common measurements, each femtocell FBSn makes an RSRP measurement of the received power of a signal that was sent by the base station in the macrocellular network considered to be dominant by said femtocell FBSn and, when taking the individual measurements, the femtocell FBSn makes RSRP measurements of the received power of a signal that was sent by each other femtocell.

15. Method for reducing co-channel interference due to the deployment of N femtocells in a macrocellular network, N being an integer, said method comprising:

taking power measurements on signals sent over this network, during which the power measurements are only taken by the N femtocells and these measurements are ordered temporally by a central facility of the system, performing optimization of transmission powers of the femtocells according to the taken power measurements, and performing allocation, to the femtocells, of their respective optimized transmission power, wherein, during the optimisation of the transmission powers of the femtocells, the transmission powers of the femtocells are maximised under the constraint of maintaining a minimum quality of service of terminals that would be attached, in the macrocellular network, to base stations of the macrocellular network, wherein taking the measurement comprises taking measurements common to the femtocells and further taking N successive individual measurements, further comprising:

collecting the measurements by the central facility followed by the optimisation that is implemented by the central facility followed by the allocation during which the central facility sends to each femtocell a signal that carries information representing the transmission power of said femtocell, wherein when taking the common measurements, no femtocell sends any signal and each femtocell, referred to as FBSn, performs a Reference Signal Received Power RSRP measurement of received power of a signal that was sent by a base station in the macrocellular network considered dominant by the femtocell FBSn, and/or a Received Signal Strength Indicator RSSI measurement of a sum of received power of a signal that was sent on a common transmission band by the base station in the macrocellular network considered to be dominant by the femtocell FBSn, and a thermal noise surrounding the femtocell FBSn, and, when taking the individual measurements, one of the femtocells, referred to as FBSm, sends a signal at its maximum power and each of the other femtocells, referred to as FBSn, then makes an RSRP measurement of the received power of a signal that was sent by the femtocell FBSm and/or an RSSI measurement that corresponds to the sum of received power of a signal sent at maximum power by the femtocell FBSm, received power of a signal that was sent by the base station in the macrocellular network considered to be dominant by the femtocell FBSn and the thermal noise surrounding the femtocell FBSn, and wherein taking the common measurements, each femtocell FBSn makes an RSRP measurement of the received power of a signal that was sent by the base station in the macrocellular network considered dominant by said femtocell and an RSSI measurement of the sum of the received power of a signal that was sent over the common transmission band by the base station in the macrocellular network considered to be dominant by the femtocell FBSn, and the thermal noise surrounding the femtocell FBSn, and, when taking the individual measurements, each of the other femtocells makes an RSSI measurement that corresponds to the sum of the received power of a signal send at maximum power by the femtocell FBSn, the received power of a signal that was sent by the base station in the macrocellular network considered to be dominant by the femtocell FBSn and the thermal noise surrounding the femtocell FBSn.

16. Method for reducing co-channel interference due to the deployment of N femtocells in a macrocellular network, N being an integer, said method comprising:

taking power measurements on signals sent over this network, during which the power measurements are only taken by the N femtocells and these measurements are ordered temporally by a central facility of the system, performing optimization of transmission powers of the femtocells according to the taken power measurements, and performing allocation, to the femtocells, of their respective optimized transmission power, wherein, during the optimisation of the transmission powers of the femtocells, the transmission powers of the femtocells are maximised under the constraint of maintaining a minimum quality of service of terminals that would be attached, in the macrocellular network, to base stations of the macrocellular network, wherein taking the measurement comprises taking measurements common to the femtocells and further taking N successive individual measurements, wherein taking the measurements, the optimisation that is implemented by each femtocell, and the allocation during which the femtocell replaces its current transmission power by the transmission power thus optimised, are iterated, wherein when taking the common measurements, no femtocell sends any signal and each femtocells, referred to as FBSn, makes an RSRP measurement of the received power of a signal that was sent by the base station in the macrocellular network considered to be dominant by the femtocell FBSn, and/or an RSSI measurement of the sum of the received power of a signal that was sent over the common transmission band by the base station in the macrocellular network considered to be dominant by the femtocell FBSn, and the thermal noise surrounding the femtocell FBSn, and, when taking the individual measurements, all the femtocells send a signal at the transmission power that was allocated thereto at a previous iteration, and one of the femtocells, referred to as FBSn, then does not send a signal and makes RSRP measurements of the received power of a signal that was sent by each other femtocell and/or an RSSI measurement that corresponds to the sum of the received power of the signals that were sent by the other femtocells, the received power of a signal that was sent by the base station in the macrocellular network considered to be dominant by the femtocell FBSn and the thermal noise surrounding the femtocell FBSn, wherein when taking the common measurements, each femtocell FBSn makes an RSRP measurement of the received power of a signal that was sent by the base station in the macrocellular network considered dominant by said femtocell FBSn and an RSSI measurement of the sum of the received power of a signal that was sent over the common transmission band by the base station in the macrocellular network considered to be dominant by the femtocell FBSn and the thermal noise surrounding the femtocell FBSn and, when taking the individual measurements, the femtocell FBSn makes an RSSI measurement that corresponds to the sum of the received power of the signals that were sent by the other femtocells, the received power of a signal that was sent by the base station in the macrocellular network considered to be dominant by the femtocell FBSn and the thermal noise surrounding the femtocell FBSn.

\* \* \* \* \*

UNITED STATES PATENT AND TRADEMARK OFFICE
CERTIFICATE OF CORRECTION

PATENT NO. : 9,622,193 B2  
APPLICATION NO. : 14/117413  
DATED : April 11, 2017  
INVENTOR(S) : Lalam et al.

Page 1 of 1

It is certified that error appears in the above-identified patent and that said Letters Patent is hereby corrected as shown below:

On the Title Page

Change:
Item (73) Assignee: SAGEMCOM ENERGY & TELECOM SAS, Rueil Malmaison (FR)

To:
(73) Assignee: SAGEMCOM BROADBAND SAS, Rueil Malmaison (FR)

Signed and Sealed this
First Day of August, 2017

Joseph Matal
*Performing the Functions and Duties of the*
*Under Secretary of Commerce for Intellectual Property and*
*Director of the United States Patent and Trademark Office*